United States Patent [19]
Peltier et al.

[11] Patent Number: 6,032,344
[45] Date of Patent: Mar. 7, 2000

[54] MULTIPLEXING OF PNEUMATIC TOOLING

[75] Inventors: Kenneth J. Peltier, Waterloo; Joseph A. Aikins, Kitchener, both of Canada

[73] Assignee: ATS Automation Tooling Systems Inc., Cambridge, Canada

[21] Appl. No.: 08/981,678

[22] PCT Filed: Jul. 5, 1996

[86] PCT No.: PCT/CA96/00449

§ 371 Date: Apr. 10, 1998

§ 102(e) Date: Apr. 10, 1998

[87] PCT Pub. No.: WO97/03392

PCT Pub. Date: Jan. 30, 1997

[51] Int. Cl.[7] .............................. B23Q 5/26; B23B 39/10; B23C 1/00
[52] U.S. Cl. ................................. 29/50; 408/130; 409/186
[58] Field of Search ..................... 29/38, 39, 40, 29/41, 50; 83/13; 408/129, 130; 409/185, 186, 187, 203, 213; 91/189.1, 511

[56] References Cited

U.S. PATENT DOCUMENTS

| | | | |
|---|---|---|---|
| 4,382,215 | 5/1983 | Barlow et al. | 318/568 |
| 4,808,000 | 2/1989 | Pasciak et al. | 356/375 |
| 4,996,898 | 3/1991 | Miller et al. | 83/13 |
| 5,882,286 | 3/1999 | Aufiero et al. | 483/55 |

*Primary Examiner*—William Briggs
*Assistant Examiner*—Daniel Phan
*Attorney, Agent, or Firm*—R. Craig Armstrong

[57] ABSTRACT

A system for operation of pneumatic tooling has a plurality of pneumatically operable tools (2). A servo-controller (21) is switchable to actuate any of the plurality of tools, to move that tool to a desired position. A position transducer (4) includes an element (9, 10) which is displaced from a home position by such actuation of any one of the tools. The position transducer sends a position feedback signal to indicate to the servo-controller when the desired tool position has been reached. The servo-controller is switchable by virtue of having its output connected to a number of valves (22), i.e. one valve per tool, where preferably only one valve is energized at a time. When a valve is at rest, the pneumatic circuit is such that the tool is held in its home position. When energized, the servo-controller outputs are routed to the tool to operate the tool.

8 Claims, 5 Drawing Sheets

MULTIPLEXING OF PNEUMATIC TOOLING

TECHNICAL FIELD

This invention relates to equipment for pneumatic operation of tooling, particularly but not limited to tooling on tooling platforms of an industrial robot.

BACKGROUND ART

Originally, most tooling platforms on robots had only one tool (the word tool here being used in a very general sense to indicate any device operable to carry out some work function). However, it is now increasingly common to have several tools on the same tooling platform, each tool operated and controlled by its own pneumatic, hydraulic or electric controls, as well as appropriate feedback systems. Traditionally, each tool has had at least two sensors to indicate its position. Thus if there were four tooling mounts on a tooling platform, eight position sensors were used. Some systems have also used two feedback sensors for each tool. Others have used an individual pneumatic position controller for each tool.

The result has been an evolution of systems having excessive mass and excessive complexity, with many valves, and a number of pneumatic servo-controllers.

DISCLOSURE OF INVENTION

It is an object of the invention to provide a pneumatic system which has significantly less mass and uses significantly fewer components than in conventional systems.

In the invention, a number of tools share a common position transducer to indicate the position of the tool in use at any given time. The transducer typically has a shaft which is extended when forced to do so by the operation of one of the tools. When none of the tools is being operated, the shaft is spring-biased back to a home position. The same transducer can be used to determine velocity and related physical quantities if desired.

Alternatively stated, the invention provides a system for operation of several pneumatically operable tools on one tooling mount. A servo-controller is switchable to actuate any one of the tools to move it to a desired position. A position transducer includes an element which is displaced from a home position by such actuation of any one of the tools. The position transducer sends a position feedback signal to indicate to the servo-controller when the desired tool position has been reached.

The servo-controller is switchable by virtue of having its output connected to a number of valves, there being one valve per tool, only one valve being energized at a time. When a valve is at rest, it is held in its home position. When energized, the servo-controller outputs are routed to the tool, and those outputs may be varied to control the tool just as if the servo-controller had been directly connected to the tool instead of routed through the valve.

BRIEF DESCRIPTION OF DRAWINGS

The invention will now be described with reference to the accompanying drawings, in which.

BEST MODE FOR CARRYING OUT THE INVENTION

Figure 1:
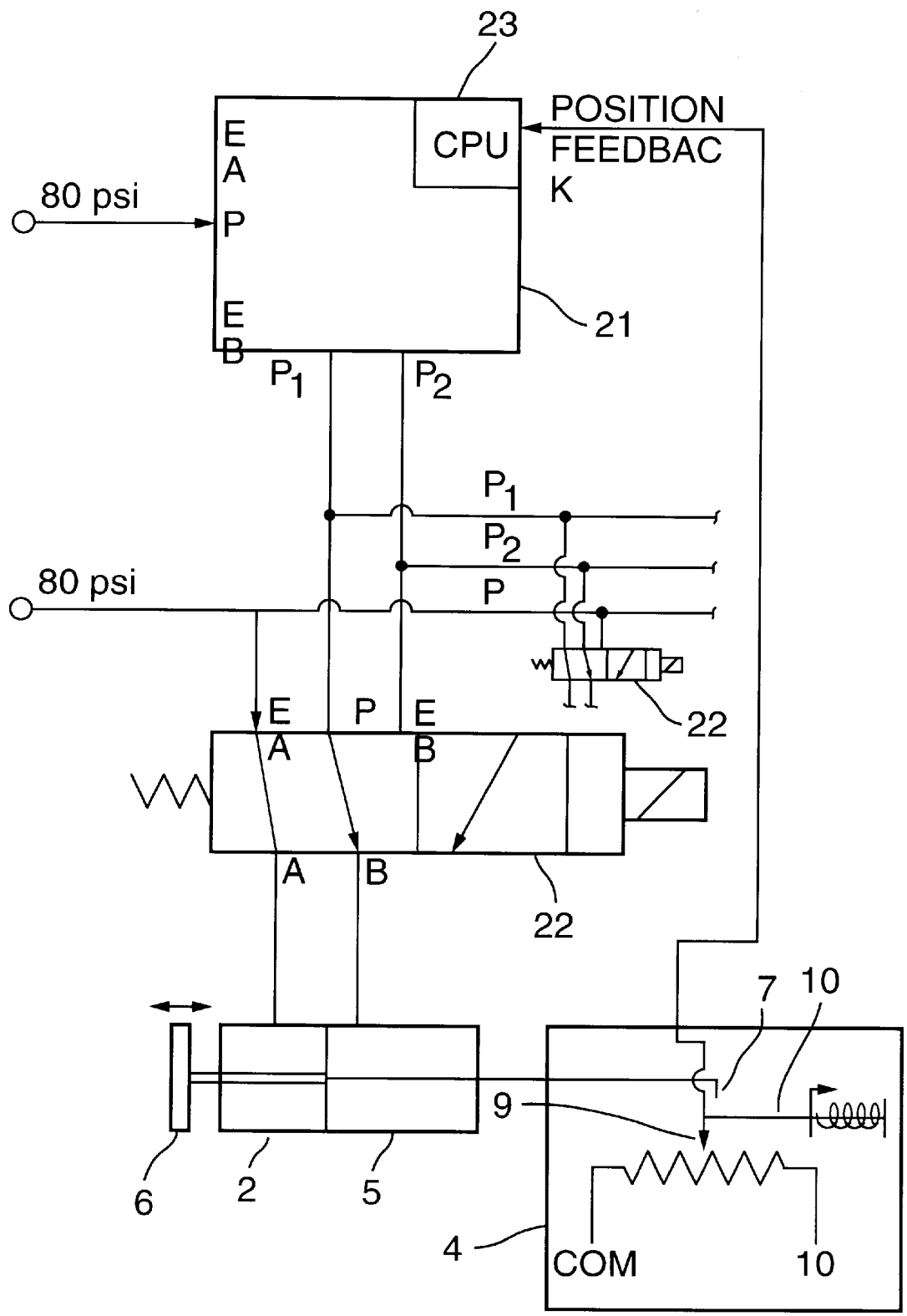
FIG. 1 is a schematic illustration of the preferred pneumatic circuit.

FIG. 1 illustrates the preferred pneumatic circuit for the invention. Before describing the circuit in detail, however, an exemplary physical embodiment will be described, for greater clarity.

In typical and preferred embodiments of the invention, there is normally a support structure, and a tooling platform on which the pneumatic controls and valves are located and on which the tool support body 1 of the invention is mounted. The tooling platform may be movable, and normally would be movable, relative to the support structure. For example, the tooling platform may be part of a robotic system which moves the tooling platform in the x-y plane, although the invention is equally applicable to a stationary tooling platform. The support structure and tooling platform are not illustrated, since they are not part of the invention as such. Indeed, they may be one and the same, for applications where it is not necessary that the tooling platform be movable relative to the support structure.

FIGS. 2–8 show a typical preferred embodiment for mounting on a tooling platform, movable or otherwise. Several tools, such as four cylinders 2, are secured to mounting plates 3 around the tool support body 1, which in turn is installed on the tooling platform. The cylinders share a single position transducer 4, instead of having separate position transducers for each tool. A novel pneumatic circuit simplifies the controls, reduces the number of valves and air lines, and requires only a single servo-controller, as will be explained later herein.

Figure 2:
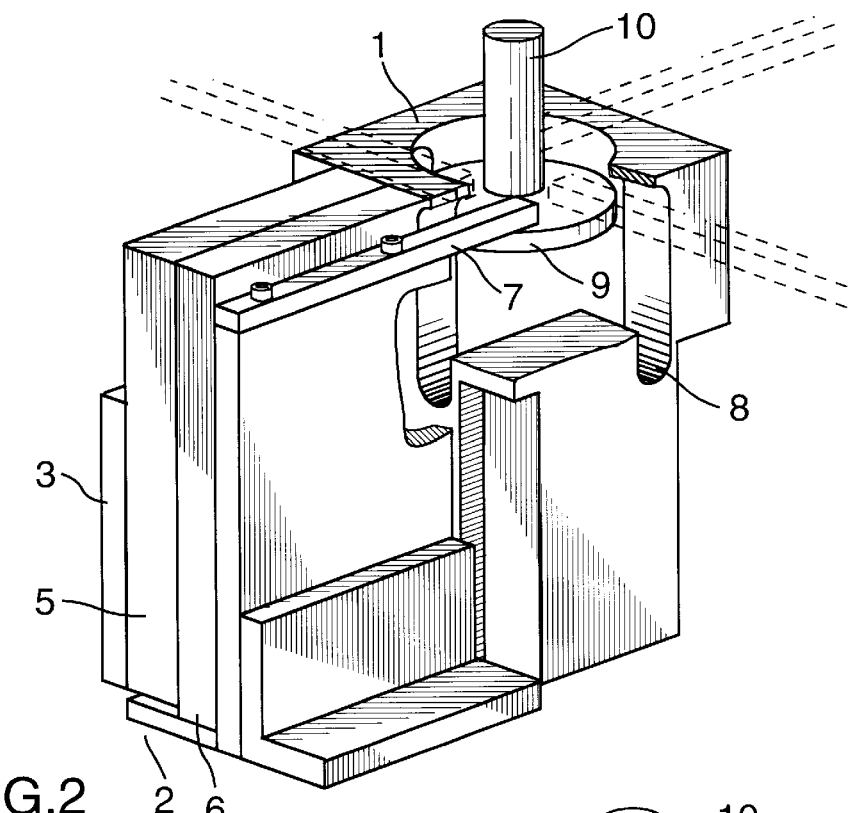
FIG. 2 is a schematic perspective of the tool support body and one of the cylinders.
Figure 3:
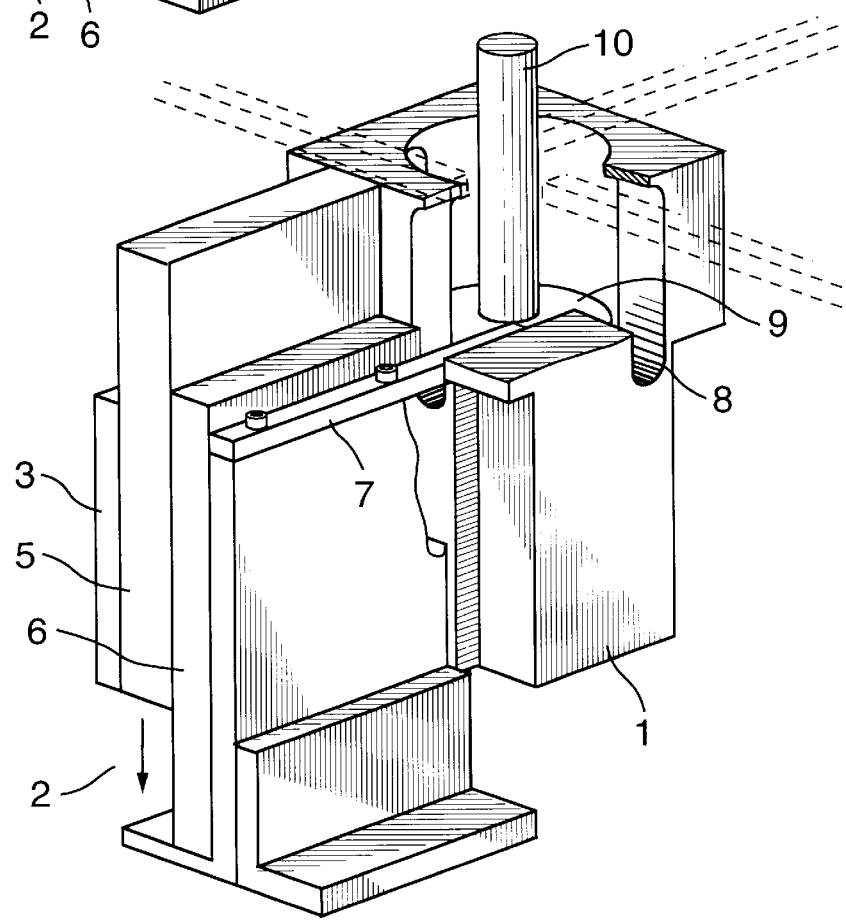
FIG. 3 is a schematic perspective identical to FIG. 2, except that the cylinder is extended.
Figure 4:
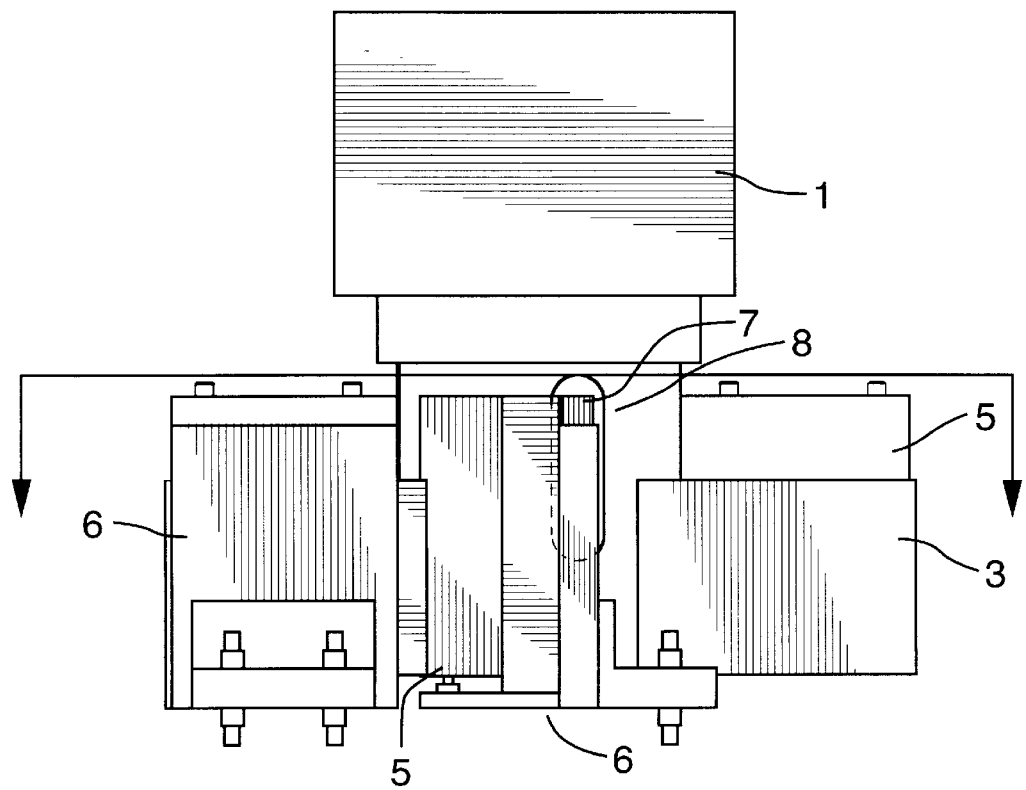
FIG. 4 is an elevation view of the assembly.
Figure 5:
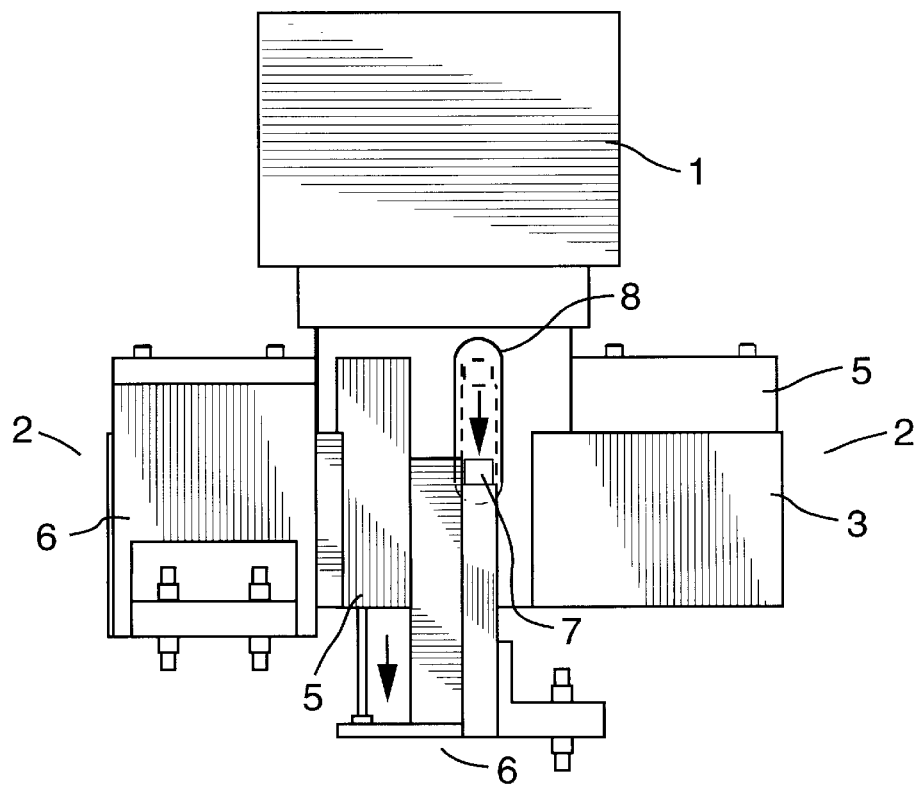
FIG. 5 is an elevation view identical to FIG. 4, except that one of the cylinders is extended.
Figure 6:
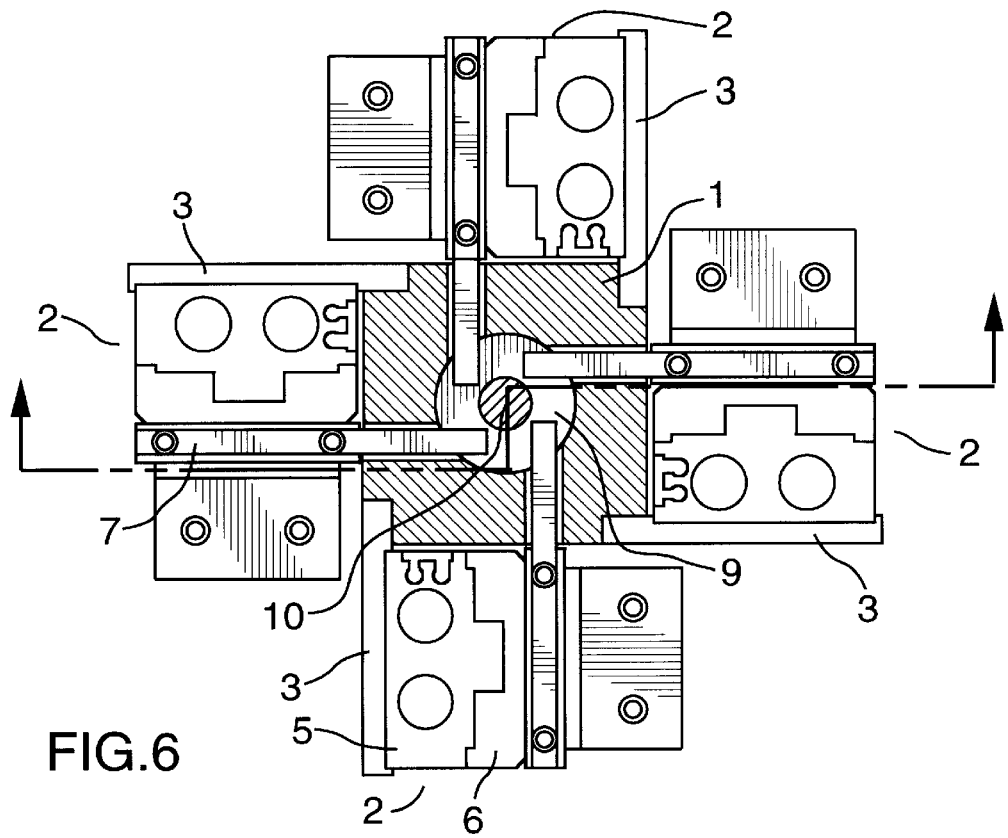
FIG. 6 is a top view of the assembly, in cross-section as shown on FIG. 4.
Figure 7:
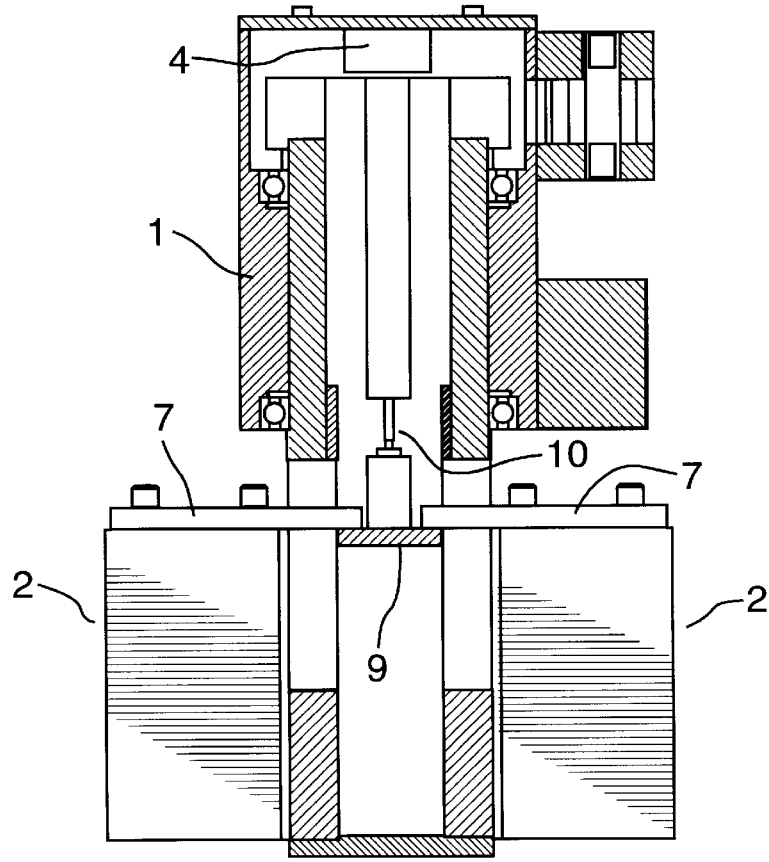
FIG. 7 is an elevation view of the assembly, in cross-section as shown on FIG. 6.
Figure 8:
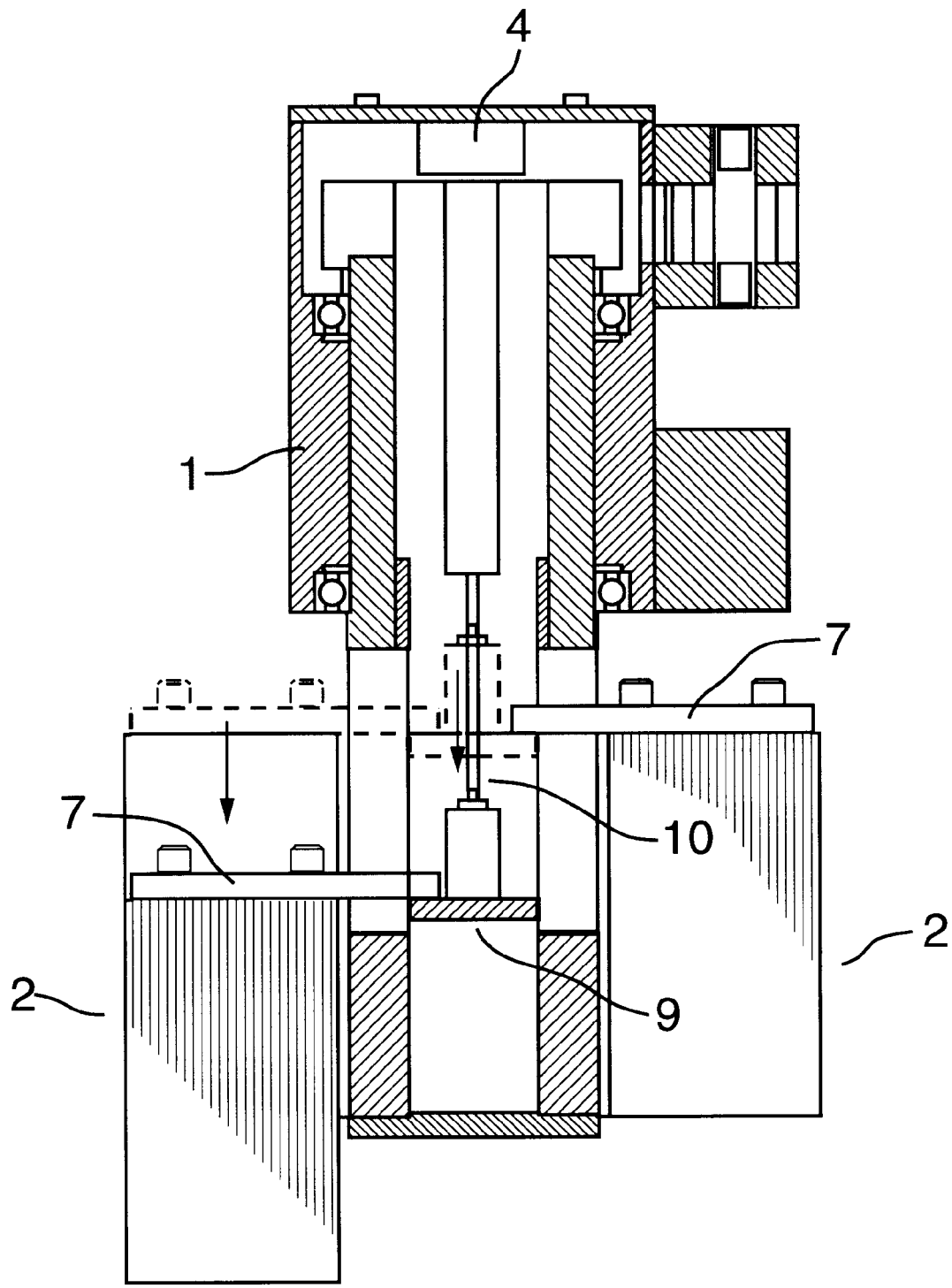
FIG. 8 is an elevation view, in cross-section, identical to FIG. 7 except that one of the cylinders is extended.

As can be seen best in FIGS. 2 and 3, but also in FIGS. 4–8, each cylinder has a stationary portion 5 secured to a mounting plate 3, and an extendable portion 6 (extendable downwardly in this case). The extendable portion of each cylinder has a finger 7 that extends into the center of the body 1, through longitudinal slots 8. When a cylinder is actuated so that the extendable portion moves downwardly, its finger pushes down a disk 9 at the end of a shaft 10 which extends upwardly to the position transducer 4 at the top of the body. A spring (not shown) returns the disk to an upward home position, corresponding to the home positions for the cylinders, i.e. the positions where the cylinders are fully retracted.

The position transducer 4 is preferably located on the center axis of the body 1, as illustrated, but actually may be located anywhere as long as all the fingers 7 can reach it.

The invention of course is useful not only for extension or retraction of cylinders, but also in connection with generally any movement of any tools, as long as a finger or some equivalent element can be brought to bear against a disk or some equivalent element of a position transducer. Generally any type of position transducer could be used as well; nor does the transducer necessarily have to be linear, since one which detects rotary motion may be more suitable in some applications, for example. The essential aspect of the transducer is merely that it must have some element which can be acted upon by some element from each of the moving tools such that it moves in response to movement of any one of the tools when the other tools are in their home positions.

As can be clearly seen from FIGS. 2 and 3, when any one cylinder is actuated, the shaft 10 is pulled downwardly so that the position transducer can track the position of the cylinder. It follows that the position transducer can only track the position of one cylinder at a time. Therefore, the remaining cylinders should normally be kept in their home positions, i.e. only one cylinder should be operated at a time. Simultaneous operation of two cylinders would be possible, but only the location of the most extended cylinder would be known, rendering such an arrangement impractical for most conceivable applications.

In the preferred embodiment, each cylinder is a two-chamber device. With appropriate modifications to the pneumatic circuit, other types of cylinders may be used, such as a one-chamber cylinder with a return spring. The invention is not restricted to cylinders only, of course, but rather may be used for any pneumatic tooling where position tracking is desired.

If desired, although not normally necessary, a switch may be included for each cylinder, to provide a positive indication if the cylinder is in its home position. If one of the switches indicates that its cylinder is not in its home position, then it is probably the cylinder being operated. If more than one cylinder is not in its home position, then a potential fault condition exists, since the position transducer will only report the position of one cylinder.

The pneumatic circuit and its operation will now be described in detail, with particular reference to FIG. 1.

A servo-controller (or "servo-valve" or "pneumatic position controller") 21, such as one of those supplied by Festo, is used to supply air to the individual cylinders 2, via valves 22. In applications involving a movable tooling platform, the servo-controller will normally be positioned on the tooling platform, to minimize the length of air lines and to speed response, although in some cases it could be on the support structure. Lines P1 and P2 from ports A and B of the servo-controller extend to a valve block (not shown). The valve block, consisting simply of a suitable mounting location for the several valves 22, is also normally mounted on the tooling platform. The valve block is also supplied with line pressure P (typically 80 psi). Air lines run from ports A and B (4 and 2 in ISO standard designation) of each valve 22 to the A and B chambers respectively of a cylinder 2.

For simplicity, FIG. 1 shows mainly only one cylinder 2 and one valve 22, although a second valve 22 is also shown as an example. It would of course have its own cylinder connected to it (not shown). Note ganged air lines P1, P2 and P (line pressure), to which any number of valves can be connected, for a corresponding number of cylinders. Each valve preferably but not necessarily is a 5-port, 4-way, 2-position valve, and is connected with its three ports EA, P and EB (5, 1 and 3 in ISO standard designation) connected to lines P, P1 and P2 respectively, in the same manner as the one illustrated valve. Thus it should be clear that only one servo-controller and one position transducer is required, whether there are two, three or four cylinders, or any number for that matter, as long as their fingers 7 can reach the disk 9.

The servo-controller 21 is fed with line pressure P, and has two exhausts, EA and EB respectively, as well as outlets A and B (here designated as P1 and P2). Unlike a normal valve, the servo-controller can regulate the pressure and flow rates at will, in accordance with instructions from a CPU 23, which may be internal to the servo-controller as illustrated, or externally located in a computer.

Only one valve at a time has its solenoid energized. As can be seen from FIG. 1, which uses standard valve symbols, energizing the solenoid of a valve results in P1 being supplied to chamber A and P2 being supplied to chamber B. The servo-controller can then effect any desired movement of the cylinder, by varying P1 and P2 as required to produce the desired result. The position transducer 4 provides the CPU with the necessary feedback to determine when the desired position has been reached, whereupon the servo-controller sets P1 and P2 equal to each other to prevent further movement. The servo-controller can control not only position, but also acceleration, by controlling the pressure differential, a larger differential pressure of course producing larger acceleration of the cylinder or other tool.

To return the cylinder to its home position, P1 and P2 are varied by the servo-controller so as to produce the desired movement towards home.

This control of the cylinder by the servo-controller is no different from the already-known control of a cylinder by a servo-controller, except that the invention permits one servo-controller to operate more than one cylinder by interposing the valves 22. Once the cylinder being operated is returned to its home position, the solenoid for its valve can be deenergized, and then the solenoid for another cylinder can be energized. When the solenoid is deenergized, line pressure (e.g. 80 psi) is connected to chamber A, while P1 is connected to chamber B. Pressures P1 and P2 are never allowed to exceed line pressure P. Therefore, since P1 is always less than line pressure, the cylinder is locked in its home position while another cylinder is being operated.

This "multiplexing" to permit the use of a single servo-controller and to reduce the number of valves, air lines and position transducers greatly reduces the size, complexity and mass of the tooling platform. It also significantly reduces the expense, particularly in reducing the number of servo-controllers required, since they are relatively expensive. Other benefits include generally faster motion and easier access to the components for service.

Many variations on the invention will be obvious to those knowledgeable in the field, and are considered to be within the scope of the invention.

The specific tooling and transducer arrangement is not essential, the principle being that a single servo-controller may be switched to operate any one of several tools, and actuation of any one of the several tools will move a shared position transducer from its home position.

Industrial Applicability

The invention is useful in a wide variety of industrial applications, for efficiently controlling multiple pneumatically operated tools.

What is claimed is:

1. A system for operation of pneumatic tooling, comprising a plurality of pneumatically operable tools, a servo-controller which is switchable using a CPU to actuate any one of the plurality of tools to move it to a desired position, and a position transducer which includes an element which is displaced from a home position by such actuation of any one of the plurality of tools, said position transducer sending a position feedback signal to indicate to said servo-controller when the desired tool position has been reached, wherein said servo-controller produces a pneumatic output connected to plurality of valves, each valve in turn being connected to a corresponding one of the tools, said CPU switching said servo-controller so that only one valve is energized at any time, each valve when at rest routing air to hold its tool in the home position, and when energized routing the pneumatic output of the servo-controller to the tool.

2. A system as recited in claim 1, wherein the tools are pneumatic cylinders.

3. A system as recited in claim 2, where there are at least two said pneumatic cylinders mounted on a body, each said cylinder having a finger extending into a central portion of said body via a slot, each said finger being positioned to bear against a disk connected to said position transducer to move said disk relative to said transducer when the cylinder carrying that finger is moved from its home position.

4. A system as recited in claim 3, where there are four said pneumatic cylinders.

5. A system as recited in claim 1, where each said valve is a 5-port, 4-way, 2-position valve.

6. A system as recited in claim 2, where each said valve is a 5-port, 4-way, 2-position valve.

7. A system as recited in claim 3, where each said valve is a 5-port, 4-way, 2-position valve.

8. A system as recited in claim 4, where each said valve is a 5-port, 4-way, 2-position valve.

* * * * *